United States Patent
Hamamura et al.

[11] Patent Number: 5,936,366
[45] Date of Patent: Aug. 10, 1999

[54] SERVO ADJUSTMENT METHOD AND APPARATUS THEREOF

[75] Inventors: Minoru Hamamura, Numazu; Sadaji Hayama; Jun Fujita, both of Mishima, all of Japan

[73] Assignee: Toshiba Kikai Kabushiki Kaisha, Tokyo-to, Japan

[21] Appl. No.: 09/160,334

[22] Filed: Sep. 25, 1998

[30] Foreign Application Priority Data

Sep. 25, 1997 [JP] Japan .................................. 9-260591

[51] Int. Cl.$^6$ .......................... G05B 19/405; G06F 15/46

[52] U.S. Cl. .......................... 318/560; 318/571; 318/572; 364/474.26; 364/474.29

[58] Field of Search .................................. 318/560–696; 364/474.01–474.37

[56] References Cited

U.S. PATENT DOCUMENTS

| | | | |
|---|---|---|---|
| 4,423,481 | 12/1983 | Reid-Green et al. | 364/474 |
| 5,189,627 | 2/1993 | Momochi et al. | 364/474.31 |
| 5,313,403 | 5/1994 | Fujita et al. | 364/474.26 |
| 5,513,490 | 5/1996 | Ueta et al. | 318/571 |

*Primary Examiner*—Paul Ip
*Attorney, Agent, or Firm*—Fish & Richardson P.C.

[57] ABSTRACT

The variation of deviations of actual positions of a moving body from corresponding command positions is quantitatively evaluated as a servo control error, whether a feedback control system is oscillating is decided on the basis of the servo control error, set values of parameters expressing characteristics of a closed loop or a control element included in the feedback control system are adjusted on the basis of the result of the decision whether the feedback control system is oscillating, and the values of the parameters are adjusted to optimum values slightly different from values which will cause the feedback control system to oscillate.

6 Claims, 5 Drawing Sheets

(a)  (b)

(a) Excessively small gain (b) Optimum gain (c) Excessively large gain

SERVO ADJUSTMENT METHOD AND APPARATUS THEREOF

BACKGROUND OF THE INVENTION

1. Field of the Invention

The present invention relates to a method of adjusting a servomechanism employed in an industrial machine, such as a numerically controlled machine tool (NC machine tool) or an industrial robot, and an apparatus for carrying out the method. More particularly, the present invention relates to a servo adjustment method and an apparatus which facilitate to reduce delay in response to an instructed position and to improve accuracy of position control.

2. Description of the Related Art

In a position control system which controls a moving body, such as a table, of an NC machine tool, an NC position instruction and a feedback position signal provided by a position transducer for measuring the position of a servomotor or the moving body are compared. The servomotor is controlled to make the moving body to reach a desired position so that the deviation from the instructed position may be reduced to zero.

For the purpose of carrying out circular arc cutting by the machine tool, two servomotors which drive a feed axis respectively are controlled simultaneously to allow the moving body for a circular interpolation feed motion. When rotating direction of the servomotor is reversed, the movable member cannot be followed in instant response to a instruction because of a lost motion of a driving mechanism for driving the moving body due to the rigidity and friction between the component parts.

When the moving body moves along a circular path from one quadrant to an adjacent quadrant, there takes place a response error such that an actual path of the moving body deviates and bulges our from a instructed path. Such phenomenon is called stick motion or quadrant protrusion and is one of the main cause of the deterioration of accuracy in machining. The reason why such a phenomenon takes place is presumed that the feed axis temporarily stopped due to a delay caused by the response characteristic of the velocity loop.

The response characteristic and the stability of the servo control system are affected considerably by the dynamic characteristics of power transmission mechanisms such as a feed screw and a nut for transmitting the driving power of a servomotor to the moving body, and a driven object such as a table, and a guide mechanism.

A conventional automatic control theory proves that the accuracy of a feedback control can be improved by increasing loop gain by raising frequency response. However, the servomechanism comprises component rigid members such as a power transmission mechanical system and a driven mechanical system having considerable mass, rigidity and frictional properties. In the closed loop system, oscillations occur at the resonant frequency of the system if loop gain is increased. On the other hand, following performance is deteriorated and errors increase if loop gain is reduced to give a priority to stability of the system.

In the conventional NC machine tool, various parameters affecting the characteristics of the servo control system must be set by a manual input operation for the final optimization adjustment of the servo control system. A conventional optimization adjustment procedure for the servo control system requires operators to examine the accuracy of motions of the NC machine tool. During optimization, the parameters are determined by a trial and error method while examining the accuracy of motions by using measuring instruments.

The adjustment operation of the servo control system requires the operators with considerable experiences and high skill to keep the system in the optimum condition, because important characteristics of the servo control system conflict each other; stability is deteriorated if accuracy and response characteristic are enhanced and vice versa. Particularly, recent NC machine tools and industrial robots require a control system with highly improved performance. The more the servo control system of those NC machine tools and industrial robots are highly sophisticated, the more operations for optimization become time consuming and complicated.

SUMMARY OF THE INVENTION

Accordingly, it is an object of the present invention to provide a servomechanism adjusting method capable of automatically and simply achieving the optimization adjustment of a servomechanism without depending on operator's experience and skill.

Another object of the present invention is to provide a servomechanism adjusting apparatus for carrying the foregoing servomechanism adjusting method of the present invention.

With these object in view, the present invention provides a method of adjusting a servomechanism including a feedback control system which feeds back a position of a moving body driven by a servomotor and controls the position of the moving body so that the moving body follows an instructed position, said method comprising: evaluating a servo control error on an quantitative basis of variation of deviations from instructed positions of the moving body; deciding whether a oscillation is occurring in the feedback control system on the basis of the servo control error; adjusting set values of servo parameters upwardly or downwardly which characterize performance of a closed loop or control elements included in the feedback control system according to the occurrence of the oscillation; and setting the value of the servo parameters at which the oscillation is about to occur as a optimum value.

The parameters include closed loop gains, said values of the closed loop gains are increased gradually to find optimum values of the closed loop gains slightly below those which caused the feedback control system to oscillate.

Preferably, the method according to claim 1, wherein the servo control parameters is any one of the parameters including position loop gain, velocity loop gain, the crossover frequency of an integration element.

The servo control error is evaluated quantitatively on the basis of a high frequency component of the variation of the deviation from instructed positions of the moving body, said moving body is being driven for a circular interpolation feed motion.

The present invention also provides n apparatus for adjusting a servomechanism including a feedback control system which feeds back a position of a moving body driven by a servomotor and controls the position of the moving body so that the moving body follows instructed position, said apparatus comprising: a evaluating means for evaluating variation of deviations from the instructed positions of the moving body on an quantitative basis as a servo control error; a decision means for deciding whether or not oscillation is occurring in the feedback control system on the basis of the servo control error; and a setting means for setting the servo parameters which characterize performance of a closed loop or control elements included in the feedback control system by adjusting set values of the servo parameters upwardly or downwardly according to the occurrence of the oscillation

BRIEF DESCRIPTION OF THE DRAWINGS

The above and other objects features and advantages of the present invention will become more apparent from the following description taken in connection with the accompanying drawings, in which.

DESCRIPTION OF THE PREFERRED EMBODIMENTS

Preferred embodiment of a servo adjustment method and an apparatus therefor according to the present invention will now be described with reference to the attached drawings.

Figure 1:
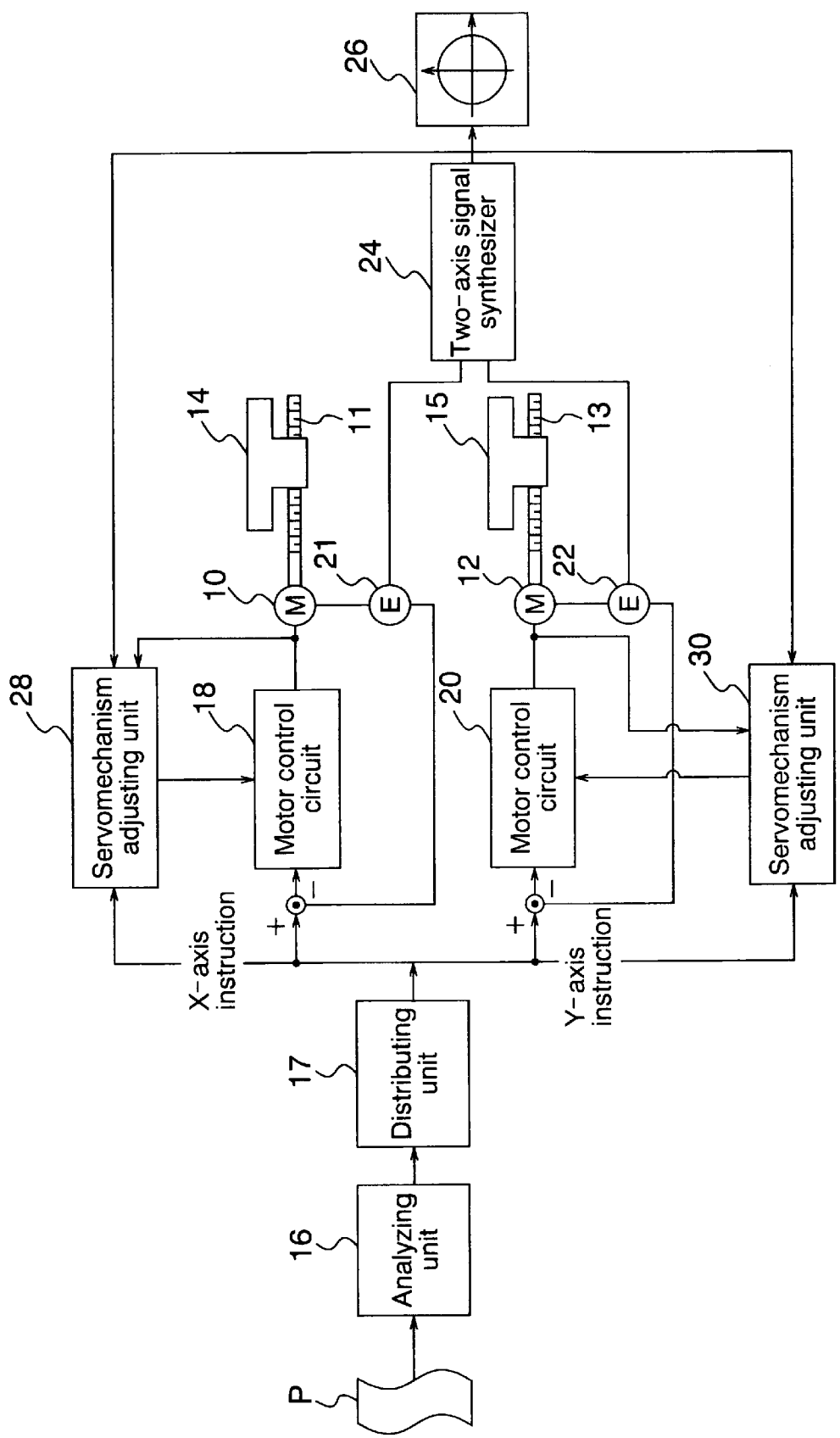
FIG. 1 is a block diagram of a servomechanism to which a preferred embodiment according to the present invention is applied.

FIG. 1 is a block diagram showing the configuration of a servo control unit for controlling servomotors which feed a table of NC machine tool, for carrying our the servo adjustment method according to the invention. The control unit adopts the semi-closed loop system.

In FIG. 1, reference numeral denotes a servomotor for driving a feed shaft 11 assigned to the X-axis, and reference numeral 12 denotes servomotor for driving a feed shaft 13 assigned to the Y-axis. The servomotors 10, 12 for the Y-axis and the Y-axis for respectively feeding a table 14 and a saddle 15 are controlled in a two-axis control mode simultaneously, to drive the table 14 for a circular interpolation feed motion.

An analyzing unit 16 converts NC program P into command data. Then a distributing unit 17 gives a position instruction signal corresponding to a specified radius R of a circular arc and a feed speed F to a motor control circuit 18 for controlling the X-axis servomotor 10 and a motor control circuit 20 for controlling the Y-axis servomotor 12 respectively.

The servomotors 10, 12, are provided with position transducers 21, 22 each comprised of a encoder. Position feedback signals provided by these position transducers 21, 22, are respectively compared with X-axis position instruction signal and Y-axis position instruction signal. Further, the motor control circuits 18, 20 control the servomotors 10,12 so as to follow the instructed position.

Outputs from the position transducers 21, 22 are synthesized by a biaxial signal synthesizer 24, and its output is delivered to a display unit 26 comprised of CRT, etc.

Accordingly, the display 26 displays a locus of angular positions of the servomotors 10, 12, which can be free from the actual influence of an power transmission mechanism, a driving mechanism and the mass of a workpiece.

The composite signal provided by the biaxial signal synthesizer 24 is introduced also to servomechanism adjusting units 28 and 29. The servomechanism adjusting units 28 and 29 use the functions of a processor included in a NC unit, and execute a procedure expressed by a flow chart shown in FIG. 4 to set automatically servo parameters, such as positionloop gain and speedloop gain, of a feedback control system to optimum values.

Figure 2:
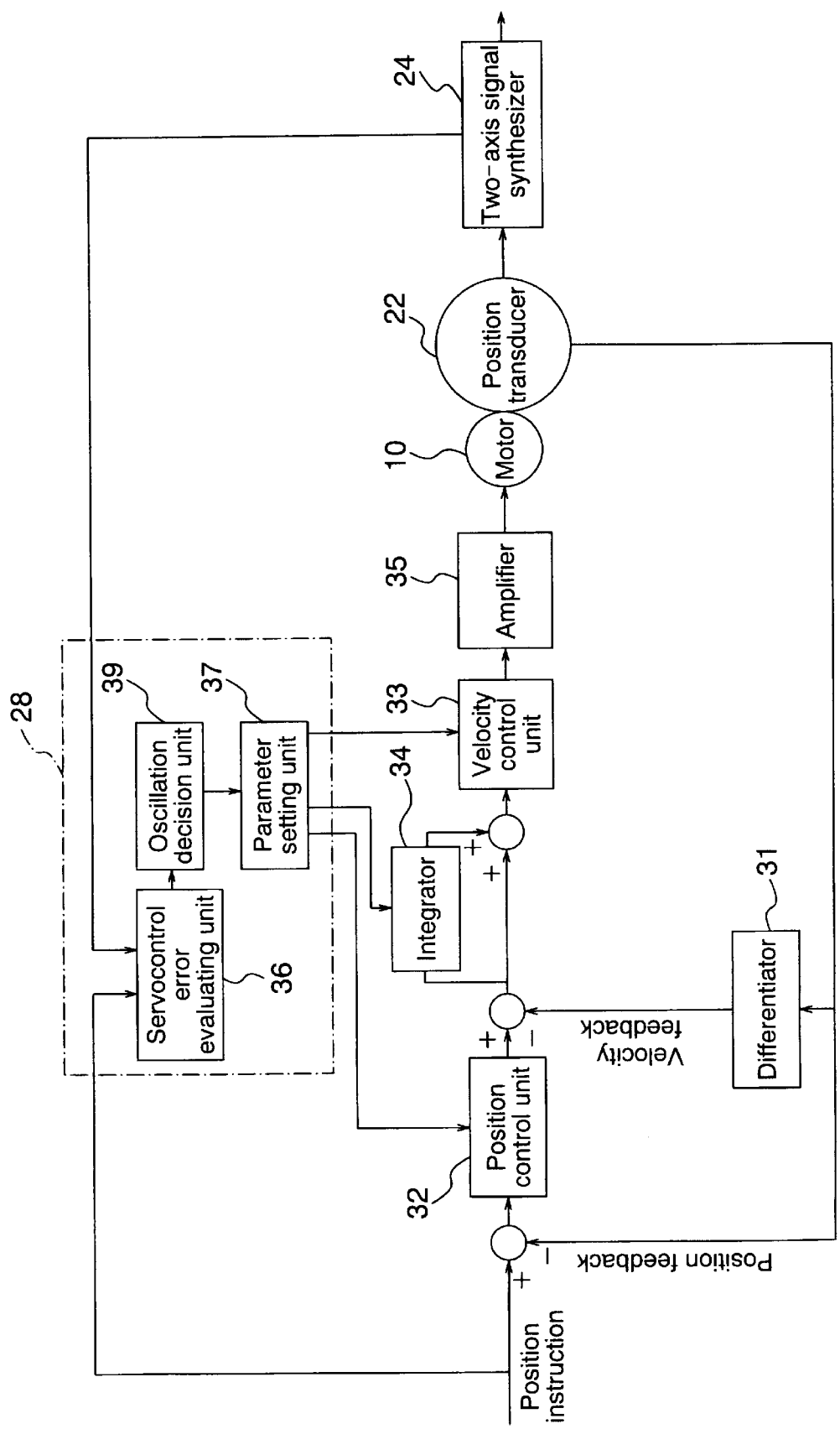
FIG. 2 is a block diagram of an essential part of the servomechanism of FIG. 1.

FIG. 2 is a block diagram showing the motor control circuit 18 of the X-axis of FIG. 1 in more detailed manner. In this case, the motor control circuit 20 of the Y-axis is similarly constituted (not shown).

A position control loop such that the deviation between a position feedback signal from the position transducer 22 and a position instruction signal reduced to 0 is constituted as the outer loop. A loop of the inside thereof is a velocity control loop, and the position feedback signal is differentiated by a differentiator 31 so that it is converted into a velocity feed back signal. Thereafter, the velocity feed back signal is compared with an output of a position control unit 32.

A integrator 34 as a compensating element is on the innermost of the velocity control loop. A output of the integrator 34 is added to a input signal for the velocity control unit 33. An output of the velocity control unit 22 is amplified by an amplified by an amplifier 34 as a torque signal which is given to servomotor 10.

A servo control error evaluating unit 36 calculates the deviation from an instructed position on the basis of an actual position provided by the two-axis signal synthesizing unit 24 and a position instruction signal, and quantitatively evaluates the variation of the deviation as servo control error. An oscillation decision unit 39 decides whether or not the feedback control system is caused to oscillate on the basis of the servo control error provided by the servo control error evaluating unit 36. A parameter setting unit 37 adjusts the set values of servo control parameters to appropriate values on the basis of a decision made by the oscillation decision unit 39. In this embodiment, servo control parameters are positionloop gain, speedloop gain, the crossover frequency of an integration element and such.

The servomechanism adjusting method will be described in detail in connection with a flow chart of a speedloop gain adjusting procedure shown in FIG. 4 for adjusting speedloop gain as a servo control parameter.

Figure 4:
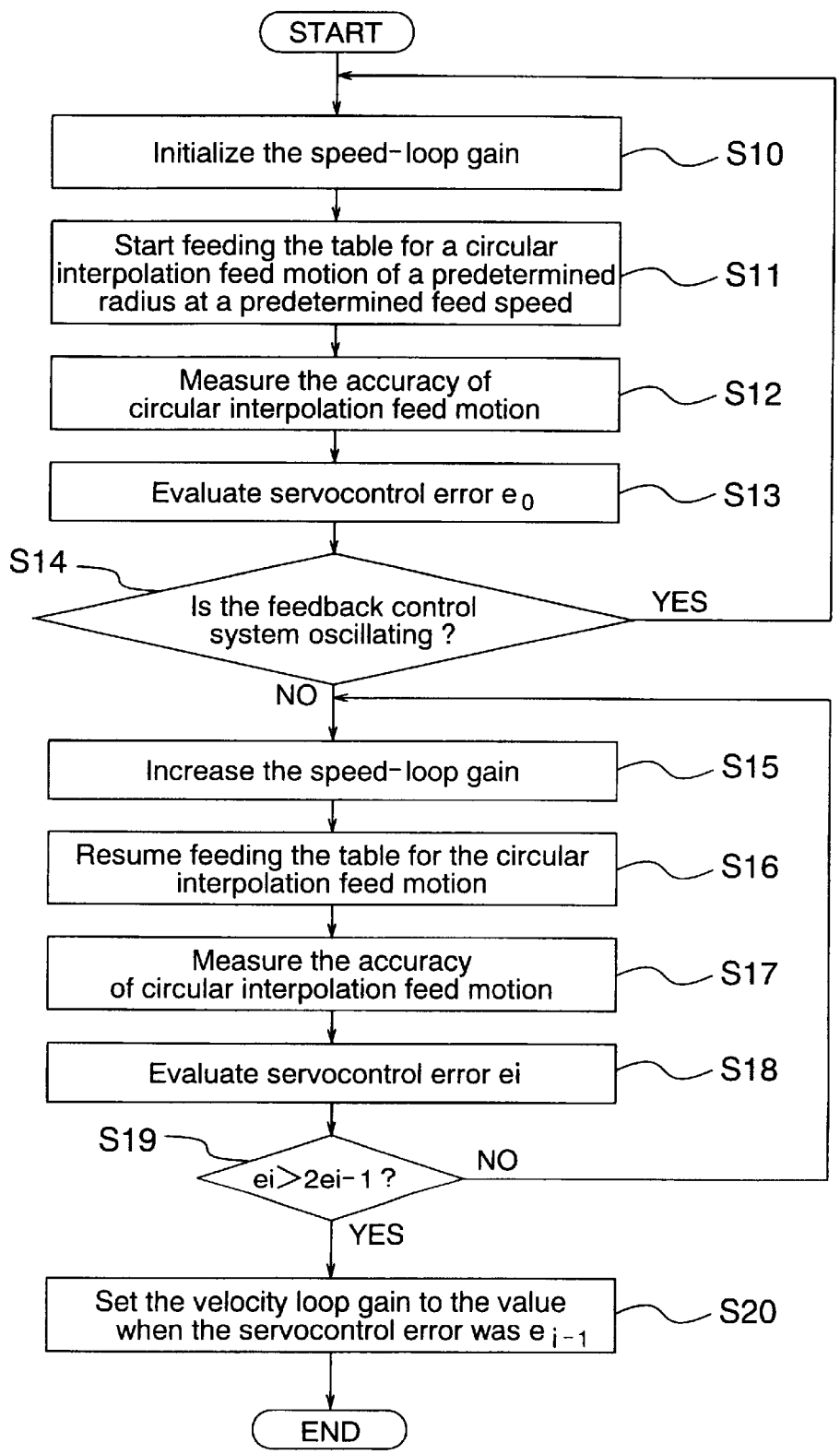
FIG. 4 is a flow chart of a procedure to be carried out by the servo adjusting method embodying the present invention.

Referring to FIG. 4, an initialization process is executed in steps S10 to S14. The speedloop gain is set to an initial value in step S10. It is undesirable to set the speedloop gain to a large initial value because oscillation of the feedback control system may occur after the beginning of the procedure in a case where the initial value of the speedloop gain is excessively large. Therefore, the initial value of the speedloop gain is relatively small.

A NC program is executed to control the table 14 for a circular interpolation feed motion along a circular path of a predetermined radius R at a feed rate F in step S11. The angular positions of the servomotors 10 and 12 are detected by the position transducers 21 and 22 during the circular interpolation feed motion, and the output signals of the position transducers 21 and 22 are synthesized by the two axis signal synthesizing unit 24. In step S12, based on the output signal of the two axis signal synthesizing unit 24, a locus of the table 14 driven for the circular interpolation feed motion, is displayed on the display 26, and the accuracy of the circular interpolation feed motion is measured.

Figure 3:
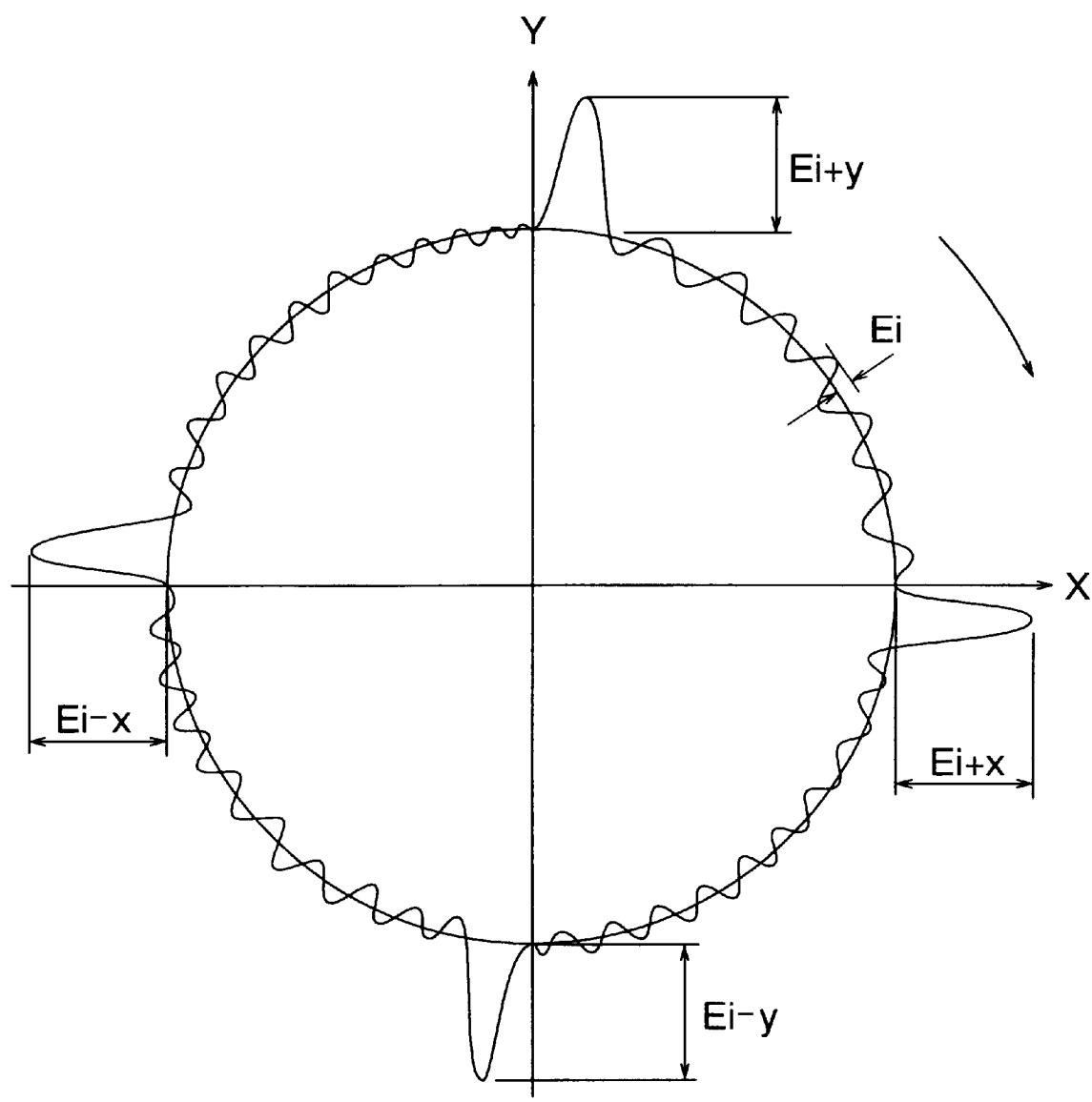
FIG. 3 is a diagrammatic view of a locus of a moving body controlled for a circular interpolation feed motion.
Figure 5:
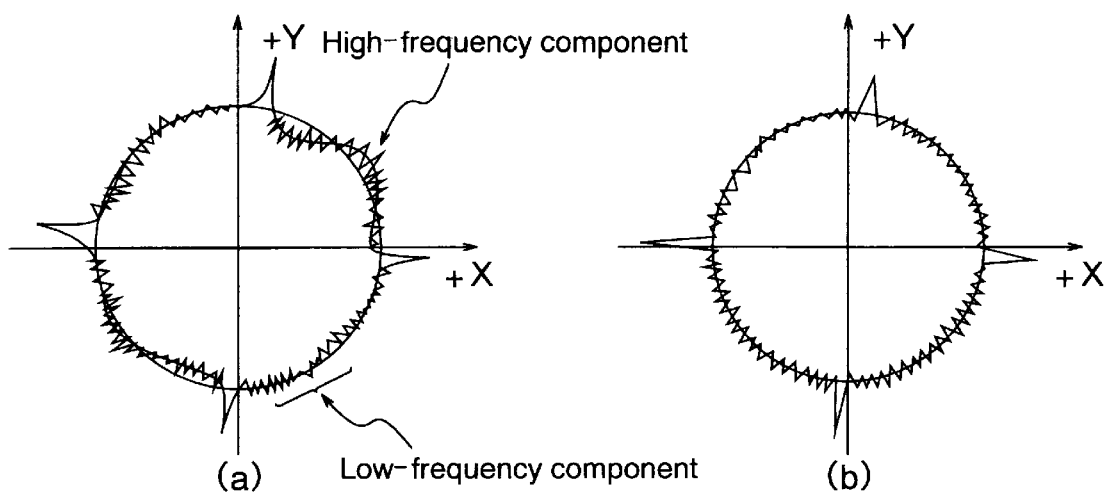
FIGS. 5(a) and 5(b) are diagrammatic views of a high frequency component and a low frequency component of a locus of the moving body controlled for a circular interpolated motion.

FIG. 3 is an example of the locus of the table 14 driven for the circular interpolated motion. In FIG. 3, $\epsilon i \pm x$ and $\epsilon i \pm y$ are quadrant protrusions that occur when the table 14 moves from one quadrant into an adjacent quadrant. These quadrant protrusions are omitted from error evaluation basis, and the rest of the deviations $\epsilon i$ from instructed positions are used as basis for servo control error evaluation. As shown in FIG. 5($a$), an actually measured wave of deviations $\epsilon i$ includes a low-frequency component and a high-frequency component. Since the low-frequency component does not contribute to the error evaluation, the low-frequency component is removed by filtering to obtain only the high frequency component as shown in FIG. 5($b$). A servo control error is determined from the wave form of the high frequency component.

The servo control error is evaluated by the servo control error evaluating unit 36 in step S13. The servo control error evaluating unit 36 calculates the mean value of the absolute values of displacements because the displacement and amplitude of deviation I vary according to positions, and evaluates the mean value as a servo control error e0 in the initial state. A maximum displacement or a mean amplitude may be used as a servo control error.

In step S14, the oscillation decision unit 39 examines the feedback control system to check whether or not the oscillation occurs in the feedback control system. The oscillation decision unit 39 decides that the feedback control unit is oscillating if, for example, the servo control error e0 is greater than a predetermined reference value. If it is decided that the feedback control system is oscillating, the speedloop gain is initialized again.

Figure 6:
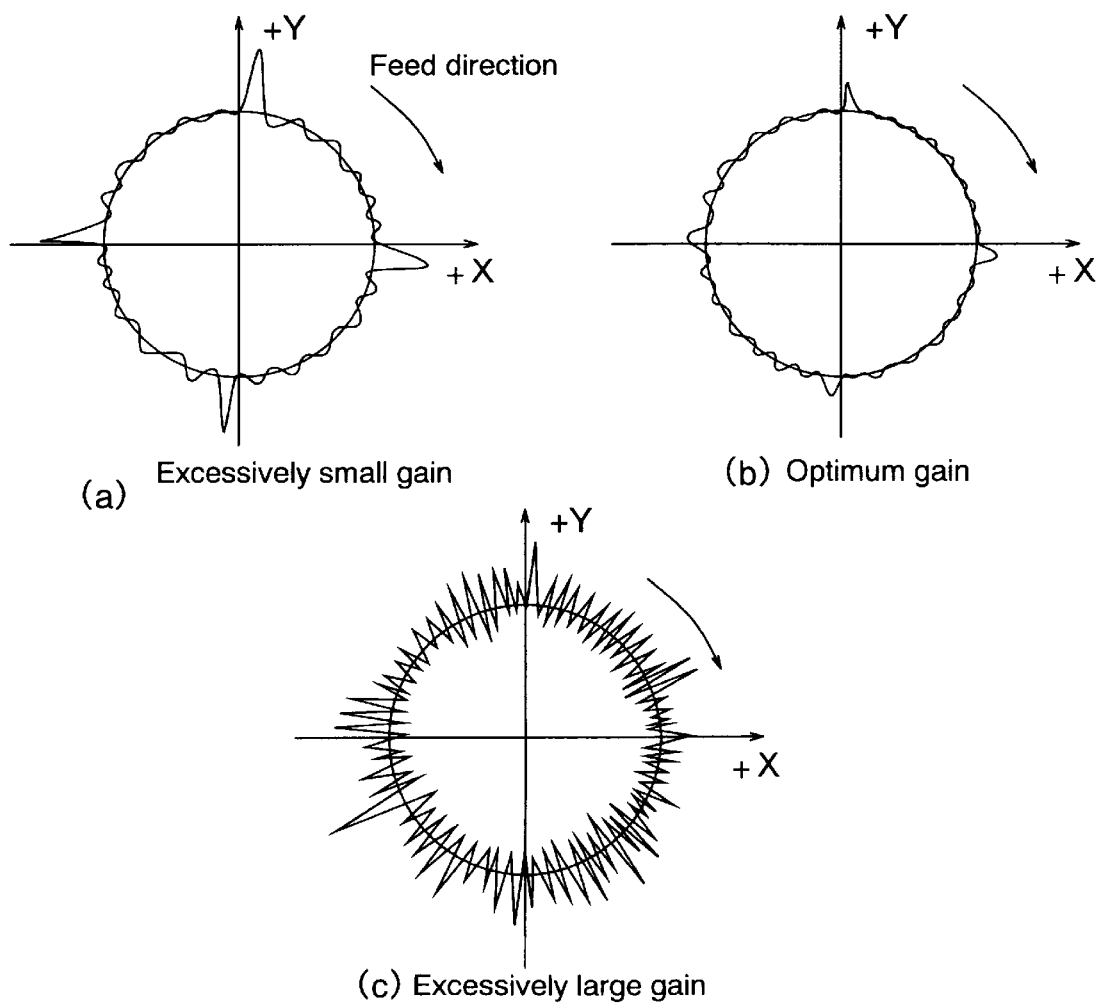
FIGS. 6(a), 6(b) and 6(c) are diagrammatic views of loci of the moving body for different set values of gain.

FIG. 6($a$) shows a locus of the table 14 driven for the circular interpolated motion when the speedloop gain is initialized. The movement of the table 14 is stable but the response of the table 14 is not satisfactory and the table 14 deviates greatly from instructed positions when the speedloop gain is relatively low.

In the case where the feedback control system is not oscillating, the parameter setting unit 37 increases the value of the speedloop gain in step S15. The increased speedloop gain is determined, for example, by a square approximation method or by increasing the initial value of the speedloop gain by a predetermined increment of 5 or 10.

After the speedloop gain has been set to an increased set value, the circular interpolation feed motion is resumed under the initial conditions in step S16. The locus of the movement is displayed on the display 26, and the accuracy of the circular interpolated motion is measured in step S17 in the manner similar to the foregoing step S12, and the servo control error ei is evaluated in step S18.

In step S19, the servo control error ei is compared with the servo control error ei–1 evaluated in the preceding control cycle using the uncorrected speedloop gain. If the servo control error ei is greater than a value obtained by multiplying the servo control error ei–1 evaluated in the preceding control cycle by a coefficient, such as two, the oscillation decision unit 39 decides that the feedback control system is oscillating as shown in FIG. 6($c$). The value of the coefficient is determined properly according to the characteristics of the control system.

If the feedback control system is not oscillating (if the response to the query in step S19 is negative), steps S15 to S19 are repeated to further increase the speedloop gain. The deviation decreases as the value of the speedloop gain is increased and thereby the response characteristic is improved. If the speedloop gain is increased beyond an appropriate value, an oscillation as shown in FIG. 6($c$) is generated. When it is decided in step S19 that the feedback control system is oscillating, the speedloop gain is set to the value set in the preceding control cycle executed before the oscillation occurred. Then the feedback control system functions in an improved response characteristic to move the table 14 along a locus having the least deviation as shown in FIG. 6($b$).

Although the speedloop gain setting procedure has been described, other parameters, such as the crossover frequency c of the speedloop gain, the positionloop gain, and the crossover frequency a of the integrator 34, can be set to optimum values which improve servo rigidity by like procedures.

Since the feed speed of a practical machine tool varies in a certain range, several optimum values for the parameters may be determined for feed speeds in the range of a normal feed speed to a maximum feed speed, and the parameters may be set to the minimum values to secure the stable operation of the feedback control system. Although the foregoing servomechanism adjusting method is of a semi closed loop control system, the servomechanism adjusting method may be of a hybrid control system or a full closed loop control system.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A method of adjusting a servomechanism including a feedback control system which feeds back a position of a moving body driven by a servomotor and controls the position of the moving body so that the moving body follows an instructed position, said method comprising:

evaluating a servo control error on an quantitative basis of variation of deviations from instructed positions of the moving body;

deciding whether an oscillation is occurring in the feedback control system on the basis of the servo control error;

adjusting set values of servo parameters upwardly or downwardly which characterize performance of a closed loop or control elements included in the feedback control system according to the occurrence of the oscillation; and setting the value of the servo parameters at which the oscillation is about to occur as an optimum value.

2. The method according to claim 1, wherein the parameters include closedloop gains, said values of the closed loop gains are increased gradually to find optimum values of the closedloop gains slightly below those which caused the feedback control system to oscillate.

3. The method according to claim 1, wherein the servo control parameters is any one of the parameters including position loop gain, velocity loop gain, the crossover frequency of an integration element.

4. The method according to claim 1, wherein the servo control error is evaluated quantitatively on the basis of a high frequency component of the variation of the deviation from instructed positions of the moving body, said moving body is being driven for a circular interpolation feed motion.

5. The method according to claim 4, wherein an low frequency component included in the variation of the deviation is removed before the servo control error evaluation.

6. An apparatus for adjusting a servomechanism including a feedback control system which feeds back a position of a moving body driven by a servomotor and controls the position of the moving body so that the moving body follows instructed position, said apparatus comprising:

an evaluating means for evaluating variation of deviations from the instructed positions of the moving body on an quantitative basis as a servo control error;

a decision means for deciding whether or not oscillation is occurring in the feedback control system on the basis of the servo control error; and a setting means for setting the servo parameters which characterize performance of a closed loop or control elements included in the feedback control system by adjusting set values of the servo parameters upwardly or downwardly according to the occurrence of the oscillation.

* * * * *